(12) United States Patent
Hotta et al.

(10) Patent No.: US 8,165,003 B2
(45) Date of Patent: Apr. 24, 2012

(54) OPTICAL PICKUP DEVICE

(75) Inventors: Tohru Hotta, Ora-gun (JP); Ryouichi Kawasaki, Isesaki (JP); Shigeru Nakamura, Tachikawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 897 days.

(21) Appl. No.: 11/442,496

(22) Filed: May 25, 2006

(65) Prior Publication Data

US 2006/0280065 A1 Dec. 14, 2006

(30) Foreign Application Priority Data

May 30, 2005 (JP) ................................. 2005-156941

(51) Int. Cl.
*G11B 7/135* (2006.01)
(52) U.S. Cl. ......... 369/112.17; 369/112.16; 369/112.01; 369/112.09; 369/44.37
(58) Field of Classification Search .................. None
See application file for complete search history.

(56) References Cited

U.S. PATENT DOCUMENTS

| | | | |
|---|---|---|---|
| 2003/0053397 A1* | 3/2003 | Katayama et al. | 369/112.17 |
| 2005/0243671 A1* | 11/2005 | Chang | 369/53.1 |
| 2006/0028932 A1* | 2/2006 | Nakamura et al. | 369/44.23 |

FOREIGN PATENT DOCUMENTS

| | | | |
|---|---|---|---|
| JP | 10228668 A | | 8/1998 |
| JP | 10255317 A | | 9/1998 |
| JP | 2002269795 A | | 9/2002 |
| JP | 2003091863 A | | 3/2003 |
| JP | 2003141769 | * | 5/2003 |
| JP | 2003141769 A | | 5/2003 |
| JP | 2004146031 A | | 5/2004 |
| WO | WO 2004/003901 A1 | | 1/2004 |

OTHER PUBLICATIONS

Japanese Office Action, Notice of Grounds for Rejection, Jan. 12, 2010, 2-pgs.

* cited by examiner

*Primary Examiner* — Joseph Haley
*Assistant Examiner* — Ifedayo Iluyomade
(74) *Attorney, Agent, or Firm* — Pillsbury Winthrop Shaw Pittman LLP

(57) ABSTRACT

A first laser source is arranged on a transmitting side of a polarizing beam splitter, while a second laser source is arranged on a reflecting side of the polarizing beam splitter. The splitting surface of the polarizing beam splitter has a film characteristic of substantially transmitting s-polarization component of the laser light having the first wavelength emitted by the first laser source and substantially reflecting s-polarization component of the laser light having the second wavelength emitted by the second laser source. A plate-like beam splitter serves to introduce laser light reflected off of a signal recording medium into an optical detector by directing the laser light away from the optical path in which the laser sources are located. The plate-like beam splitter includes a splitting surface which has a reflectance that is higher than its transmittance.

9 Claims, 5 Drawing Sheets

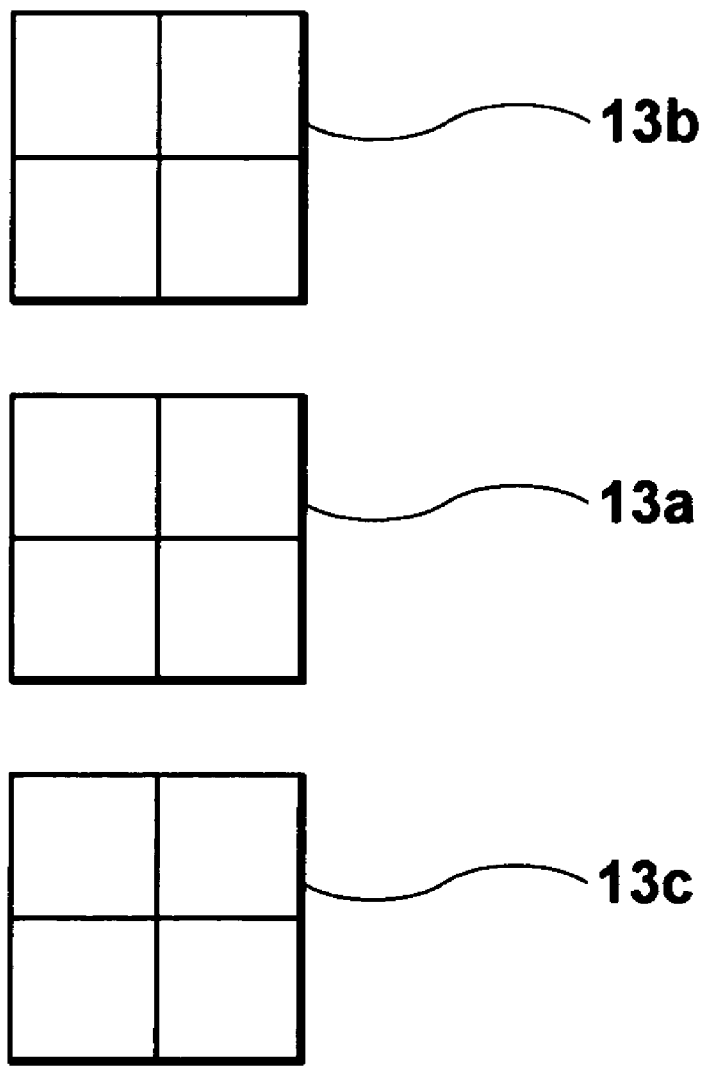

OPTICAL PICKUP DEVICE

CROSS-REFERENCE TO RELATED APPLICATION

This application claims priority to Japanese Patent Application No. 2005-156941 filed on May 30, 2005, which is incorporated herein by reference in its entirety.

BACKGROUND OF THE INVENTION

1. Field of the Invention

The present invention relates to an optical pickup device including a first laser source which emits laser light having a first wavelength, and a second laser source which is arranged in an optical path apart from that of the first laser source and emits laser light having a second wavelength which differs from the first wavelength. In this optical pickup device, each of the laser light rays emitted from the first and the second laser source is introduced into a common optical path by means of a polarizing beam splitter. The laser light directed into the common optical path is reflected by a plate-like beam splitter so as to be directed through an objective lens. The laser light is then converged by means of the objective lens and irradiated on a signal recording medium. Laser light reflected off of the signal recording medium is transmitted through the plate-like beam splitter and directed to an optical detector.

2. Description of the Related Art

Optical pickup devices which are compatible for performing recording and reproduction using signal recording mediums having different recording densities such as DVDs (digital versatile discs) and CDs (compact discs) have been known. A conventional optical pickup device compatible for performing recording and reproduction using DVDs and CDs may be configured using a beam splitter. In such a device, a laser source for DVD and a laser source for CD may be respectively arranged on the reflecting side and on the transmitting side of the splitting surface. Alternatively, in an opposite approach, the laser source for CD and the laser source for DVD may be respectively arranged on the reflecting side and the transmitting side. The optical pickup device is configured such that laser light emitted from each of the laser sources is directed into a common optical path by means of the beam splitter and irradiated into an objective lens. By selecting either of the laser sources depending on the type of the disc used, the optical pickup device can execute recording and reproduction using DVDs and CDs.

When employing a beam splitter as described above in order to arrange the laser source for DVD and the laser source for CD in optical paths apart from one another, a polarizing beam splitter is used as the beam splitter. In this case, in accordance with the typical film characteristic of the splitting surface of the polarizing beam splitter, i.e., the characteristic that p-polarization transmittance is higher than s-polarization transmittance, it is configured such that laser light incident into the reflecting side of the splitting surface of the polarizing beam splitter is s-polarized, while laser light incident into the transmitting side of the splitting surface of the polarizing beam splitter is p-polarized (refer to Japanese Patent Laid-Open Publication No. 2003-141769).

A laser diode used as the laser source for DVD or the laser source for CD emits laser light that is linearly polarized parallel to the p-n junction surface of the laser chip. Accordingly, the polarization direction of the laser light with respect to the splitting surface of the polarizing beam splitter can be set by selecting the orientation (rotating direction) of the laser source for DVD or the laser source for CD.

Further, in a typical optical pickup device, in addition to arranging a laser diode which emits s-polarized laser light on the reflecting side of the splitting surface of the polarizing beam splitter and arranging a laser diode which emits p-polarized laser light on the transmitting side of the splitting surface of the polarizing beam splitter, a quarter-wave plate is provided on the upstream side of the objective lens in the outgoing optical path by which the laser light advances toward the disc. By causing the linear polarization directions of the incoming and outgoing laser light beams passing through the quarter-wave plate to differ by 90°, the film characteristic of the splitting surface of the polarizing beam splitter can be employed to prevent the returning light reflected off of the disc from reaching back to the laser diode emitting laser light.

As described in the above-noted Japanese Patent Laid-Open Publication No. 2003-141769, in order to achieve downsizing and efficient arrangement of various optical elements in an optical pickup device, a light-receiving optical system and a light-emitting optical system may be separately provided by a second beam splitter. The second beam splitter is provided apart from the polarizing beam splitter which is provided in the common optical path for DVD and CD. The light-receiving optical system introduces the returning light reflected off of the disc into the optical detector. The light-emitting optical system for laser light emission includes the polarizing beam splitter, the laser diode for DVD, and the laser diode for CD.

In an optical pickup device in which a second beam splitter is provided and laser light reflected by the second beam splitter is directed through the objective lens, both laser light beams for DVD and CD are reflected by the second beam splitter. Accordingly Light use efficiency in connection with the splitting surface (reflecting surface) of the second beam splitter is higher for s-polarized laser light than for p-polarized laser light.

As described in the above-noted Japanese Patent Laid-Open Publication No. 2003-141769, an optical pickup device compatible for performing recording and reproduction using DVDs and CDs is often designed while giving priority to light use efficiency of the DVD optical system over light use efficiency of the CD optical system, because the emission output intensity obtained using the laser diode of the laser source for DVD often does not include much margin in view of the output intensity determined during the design stage.

In order to prioritize light use efficiency of the laser light for DVD, the laser diode for DVD is arranged on the reflecting side of the polarizing beam splitter such that laser light emitted from the laser diode for DVD is subjected to s-polarization reflection at the splitting surface of the polarizing beam splitter, while the laser diode for CD is arranged on the transmitting side of the polarizing beam splitter such that laser light emitted from the laser diode for CD is subjected to p-polarization transmission at the splitting surface of the polarizing beam splitter.

When, apart from the polarizing beam splitter for separately arranging the first and the second laser sources, the second beam splitter is provided in the common optical path in order to separate the light-receiving optical system for introducing light into the optical detector and the light-emitting optical system for emitting laser light, the polarized states of the laser light for DVD and the laser light for CD with respect to the splitting surface of the second beam splitter are s-polarized and p-polarized, respectively, or vice versa. Accordingly, at the second beam splitter, when the device design is determined while giving priority to light use efficiency of one of the laser lights (laser light for DVD, for example), light use efficiency of the other laser light (laser light for CD, for example) is compromised.

The optical pickup device described in the above-noted Japanese Patent Laid-Open Publication No. 2003-141769 is configured such that both the laser light for DVD and the laser light for CD are reflected at the splitting surface of the second beam splitter so as to be directed to the objective lens. The laser light incident on the splitting surface of the second beam splitter in s-polarized state, i.e., the laser light for DVD whose light use efficiency is given priority, is reflected efficiently, while reflection of the laser light incident on the splitting surface in p-polarized state, i.e., the laser light for CD, is not efficiently performed.

In order to improve the reflection efficiency of the laser light for CD which is incident on the splitting surface of the second beam splitter in p-polarized state in the above-described optical pickup device, it is necessary to implement a further feature for the film design of the splitting surface by, for example, arranging the second beam splitter at an angle such that the angle of the splitting surface with respect to the optical axis of laser light is 30 degrees, which is smaller than 45 degrees. This results in increased limitations to freedom in design, as well as cost disadvantages.

Further, the optical axis on the reflecting side of the polarizing beam splitter is more strongly influenced by a tilt of the polarizing beam splitter as compared to the optical axis on the transmitting side of the polarizing beam splitter. Accordingly, when high importance is placed on light use efficiency of the DVD optical system and therefore the laser diode for DVD is arranged on the reflecting side of the polarizing beam splitter, an optical axis deviation due to a tilt of the polarizing beam splitter would cause problems in the DVD optical system which requires higher accuracy in signal recording density as compared to the CD optical system.

SUMMARY OF THE INVENTION

An optical pickup device according to an aspect of the present invention includes a first laser source which emits laser light having a first wavelength, and a second laser source which is arranged in an optical path apart from that of the first laser source and emits laser light having a second wavelength which differs from the first wavelength. In the optical pickup device, Each of the laser light rays emitted from the first and the second laser source is directed into a common optical path by means of a polarizing beam splitter. The laser light introduced into the common optical path is reflected by a plate-like beam splitter so as to be directed through an objective lens. The laser light is then converged by means of the objective lens and irradiated on a signal recording medium. Laser light reflected off of the signal recording medium is transmitted through the plate-like beam splitter and directed into an optical detector. The first laser source is arranged on a transmitting side of the polarizing beam splitter, while the second laser source is arranged on a reflecting side of the polarizing beam splitter. The polarizing beam splitter includes a splitting surface which substantially transmits s-polarization component of the laser light having the first wavelength and substantially reflects s-polarization component of the laser light having the second wavelength. The plate-like beam splitter includes a splitting surface which has a reflectance that is higher than its transmittance.

Accordingly, light use efficiency of the laser light from the first laser source arranged on the transmitting side of the polarizing beam splitter can be enhanced while ensuring light use efficiency of the laser light emitted from the second laser source arranged on the reflecting side of the polarizing beam splitter. As a result, it is possible achieve a desirable configuration in which the first laser source arranged on the transmitting side of the polarizing beam splitter, which is relatively advantageous in terms of optical axis deviation, is caused to function in correlation with a signal recording medium having higher density.

The first wavelength is preferably shorter than the second wavelength. Further, the splitting surface of the polarizing beam splitter preferably is provided with a film characteristic of substantially transmitting p-polarization component of the laser light having the second wavelength while substantially transmitting both p-polarization and s-polarization components of the laser light having the first wavelength. Moreover, it is preferable to provide, between the first laser source and the polarizing beam splitter, a diffraction filter which exhibits a diffraction effect with respect to p-polarized laser light.

Accordingly, light use efficiency of the laser light from the first laser source arranged on the transmitting side of the polarizing beam splitter can be enhanced while ensuring light use efficiency of the laser light emitted from the second laser source arranged on the reflecting side of the polarizing beam splitter, such that it is possible to configure the first laser source arranged on the transmitting side of the polarizing beam splitter, which is relatively advantageous in terms of optical axis deviation, to function in correlation with a signal recording medium having higher density. Further, by providing the above-noted film characteristic, the splitting surface of the polarizing beam splitter exhibits substantial transmission of s-polarization component with respect to the laser light of the first wavelength emitted from the first laser source while exhibiting substantial reflection of s-polarization component with respect to the laser light of the second wavelength emitted from the second laser source. According to the above-noted film characteristic, although the splitting surface is limited in connection with the laser light of the first wavelength in that the splitting surface must substantially transmit the s-polarization component, no design limitations are created in relation to transmittance of the p-polarization component. Accordingly, it is sufficient to simply configure the splitting surface to substantially transmit both p-polarization and s-polarization components in connection with the laser light of the first wavelength, such that impediments to film formation of the splitting surface are avoided.

Accordingly, both the laser light of the first wavelength and the laser light of the second wavelength are reflected by the plate-like beam splitter by virtue of s-polarization. Accordingly, light use efficiency can be enhanced for both laser light beams. In addition, the splitting surface of the plate-like beam splitter need simply be characterized to have a reflectance higher than its transmittance, resulting in minimized design limitations of the splitting surface, high freedom in the arrangement angle of the plate-like beam splitter, and cost advantages.

Accordingly, laser light which has been passed through a quarter-wave plate in both the outgoing and incoming paths is returned to the splitting surface of the polarizing beam splitter with p-polarization being its main component, such that the returned laser light transmits through the polarizing beam splitter. By providing the diffraction filter for diffracting p-polarization between the first laser source and the polarizing beam splitter, it is possible to prevent the returned laser light from interfering with the laser light emitted from the first laser source.

Moreover, by providing the diffraction filter, the laser light of the second wavelength emitted from the second laser source is prevented from reaching the first laser source. It is therefore possible to prevent the laser light of the second wavelength from being reflected by an end surface of the laser chip of the first laser source and subsequently penetrating back into the outgoing optical system of the laser light of the second wavelength.

BRIEF DESCRIPTION OF THE DRAWINGS

FIG. 5 is a diagram explaining a main light-receiving region and two sub light-receiving regions of an optical detector.

DETAILED DESCRIPTION OF PREFERRED EMBODIMENTS OF THE INVENTION

Figure 1:
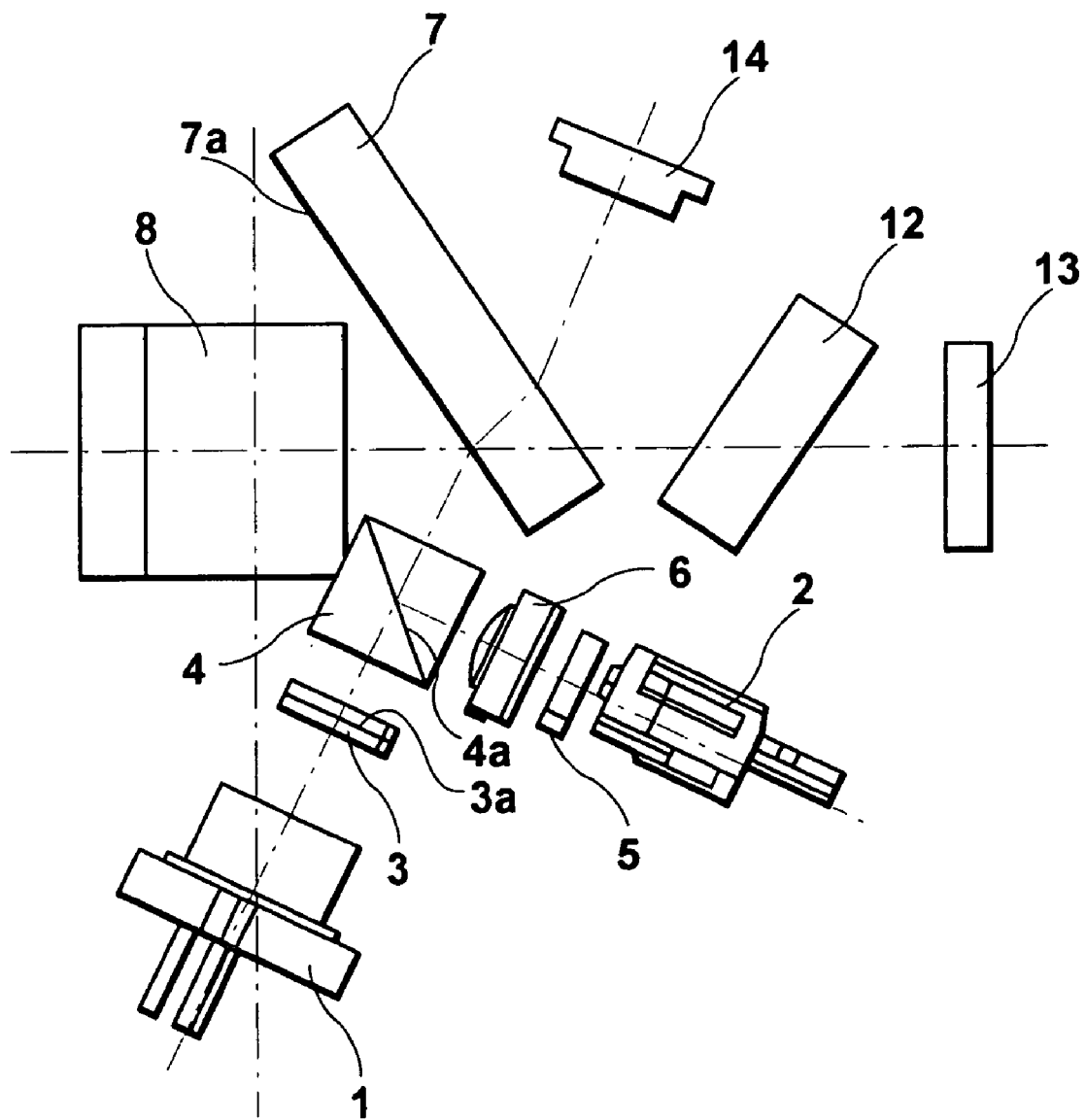
FIG. 1 is a plan view of an optical arrangement in an examplary embodiment of an optical pickup device.
Figure 2:
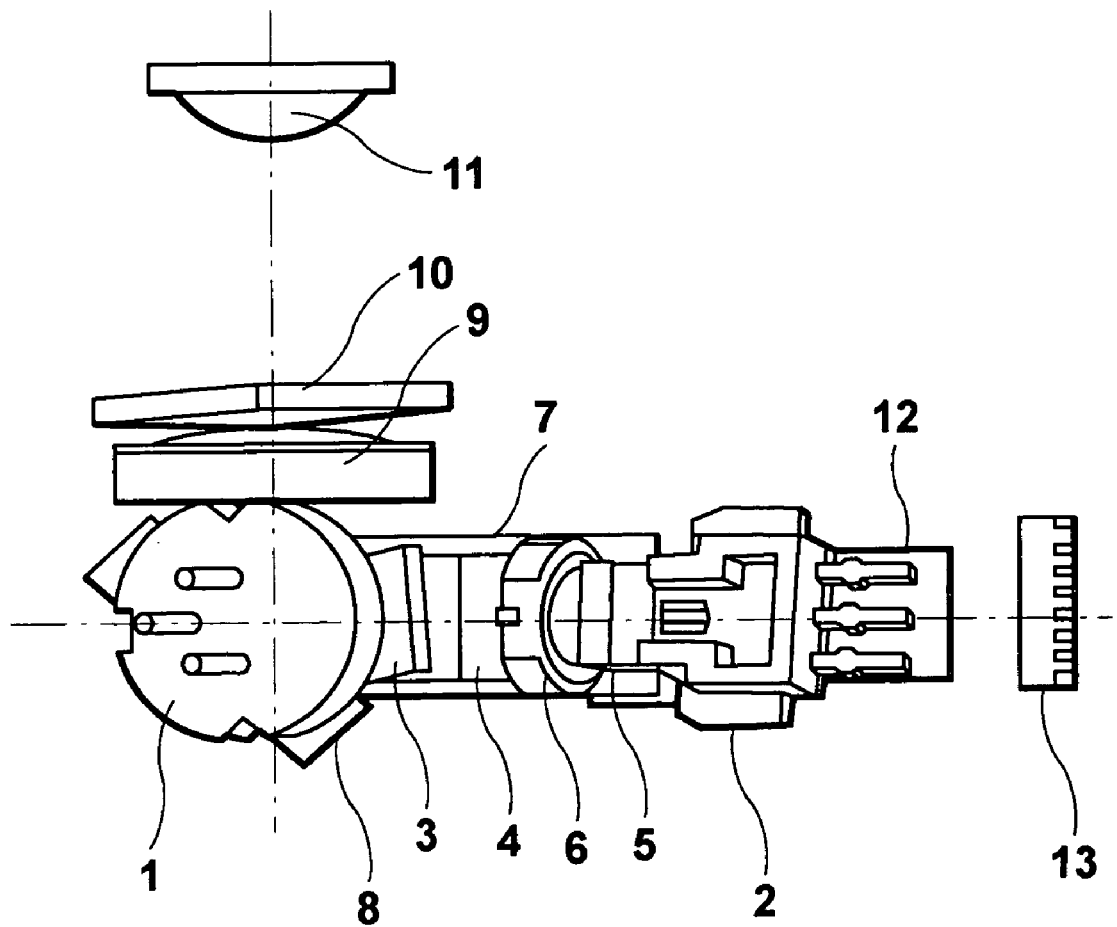
FIG. 2 is a side view of the optical arrangement in the optical pickup device of FIG. 1.

FIGS. 1 and 2 are plan and side views of an optical arrangement employed in an examplary embodiment of an optical pickup device according to an aspect of the present invention. The optical pickup device shown in FIGS. 1 and 2 is configured to be capable of performing recording and reproduction using CDs as well as DVDs.

A first can-package type laser diode 1 serving as the first laser source emits laser light having a first wavelength within the range from 650-665 nm (e.g., 660 nm) which is in the red wavelength region and appropriate for performing DVD recording and reproduction. A second frame-package type laser diode 2 serving as the second laser source emits laser light having a second wavelength within the range from 775-795 nm (e.g., 785 nm) which is in the infrared wavelength region and appropriate for performing CD recording and reproduction. The first and the second laser diodes 1, 2 are selectively used in accordance with the disc type. It should be noted that the package types of the first and the second laser diodes 1, 2 are not limited to those described above.

The laser light having the first wavelength emitted from the first laser diode 1 is split into three light beams by a diffraction grating 3 which exhibits an effective diffraction effect with respect to the first wavelength of the laser light. The three beams include, in addition to a zero diffraction beam, positive and negative first diffraction beams required for tracking control. The diffraction grating 3 is formed by laminating two cover glass plates. A three-beam splitting grating is provided on the cover glass plate on the incident side and held between the two cover glass plates, to form a diffraction filter 3a for diffracting p-polarization.

The laser light split into three beams by the diffraction grating 3 is directed to the transmitting side of a polarizing beam splitter 4 having a prism shape.

The laser light having the second wavelength emitted from the second laser diode 2 is split into three beams of zero diffraction beam and positive and negative first diffraction beams by a diffraction grating 5 which exhibits an effective diffraction effect with respect to the second wavelength of the laser light. Subsequently, magnification of the split laser light is adjusted by a coupling lens 6. This adjusted laser light is then directed to the reflecting side of the beam splitter 4.

Figure 3:
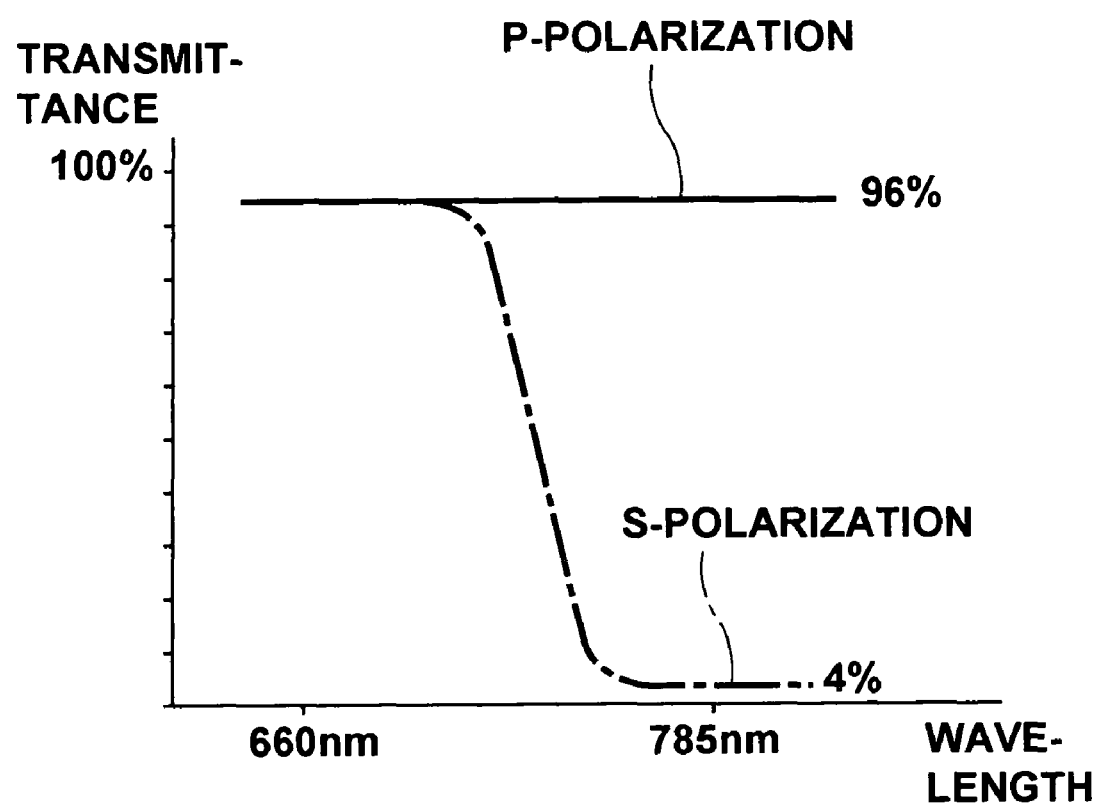
FIG. 3 is a characteristic diagram showing a film characteristic of a splitting surface of a polarizing beam splitter.

The splitting surface 4a of the polarizing beam splitter 4 is characterized as shown in FIG. 3. As shown, the splitting surface 4a has a film characteristic of substantially transmitting s-polarization component of laser light having the first wavelength which is 660 nm, and substantially reflecting s-polarization component of laser light having the second wavelength which is 785 nm. Furthermore, also as shown in FIG. 3, the splitting surface 4a substantially transmits p-polarization component of laser light having the first wavelength, and substantially transmits p-polarization component of laser light having the second wavelength.

In other words, the splitting surface 4a of the polarizing beam splitter 4 exhibits substantial transmission with respect to laser light of the first wavelength without differentiating between p-polarization and s-polarization, while, with respect to laser light of the second wavelength, substantially reflecting s-polarization and substantially transmitting p-polarization. More specifically, the splitting surface 4a of the polarizing beam splitter 4 exhibits transmittance of approximately 96% with respect to laser light of 660 nm for both p-polarization and s-polarization, while exhibiting, with respect to laser light of 785 nm, transmittance of approximately 4% (reflectance of approximately 96%) for s-polarization component and transmittance of approximately 96% for p-polarization component.

As such, the splitting surface 4a of the polarizing beam splitter 4 has the film characteristic of substantially transmitting s-polarization component of laser light having the first wavelength, and substantially reflecting s-polarization component of laser light having the second wavelength. Accordingly, the first laser diode 1 arranged on the transmitting side of the polarizing beam splitter 4 is positioned by orienting the p-n junction of the laser chip such that a generated laser light has the linear polarization direction which is s-polarized with respect to the splitting surface 4a. Further, the second laser diode 2 arranged on the reflecting side of the polarizing beam splitter 4 is also positioned by orienting the p-n junction of the laser chip such that a generated laser light has the linear polarization direction which is s-polarized with respect to the splitting surface 4a.

As a result, the laser light of the first wavelength emitted from the first laser diode 1 is substantially transmitted through the splitting surface 4a of the polarizing beam splitter 4 after passing through the diffraction filter 3a provided in the diffraction grating 3. On the other hand, the laser light of the second wavelength emitted from the second laser diode 2 is substantially reflected at the splitting surface 4a of the polarizing beam splitter 4.

The laser light of the first wavelength transmitted through the splitting surface 4a of the polarizing beam splitter 4 and the laser light of the second wavelength reflected at the splitting surface 4a of the polarizing beam splitter 4 are directed into a common optical path. The laser light in the common optical path is then reflected by a splitting surface 7a of a plate-like beam splitter 7 having a parallel flat plate shape, such that the optical axis is bent. Subsequently, the laser light is reflected by a surface of a bend-up mirror 8, resulting in further bending of the optical axis. The laser light is then formed into parallel rays by a collimator lens 9, and directed to an objective lens 11 via a quarter-wave plate 10.

The objective lens 11 is constituted with a bifocal lens compatible with laser wavelengths for both DVD and CD. The numerical aperture (NA) with respect to the laser wavelength for DVD is designed to be 0.655, while the NA with respect to the laser wavelength for CD is designed to be 0.51. When the laser light of the first wavelength emitted from the first laser diode 1 corresponding to DVD is directed through the objective lens 11, this laser light of the first wavelength is irradiated on a signal surface of a DVD by appropriately focusing the laser light in accordance with the DVD substrate thickness of 0.6 mm. On the other hand, when the laser light of the second wavelength emitted from the second laser diode 2 corresponding to CD is directed through the objective lens 11, this laser light of the second wavelength is irradiated onto a signal surface of a CD by appropriately focusing the laser light in accordance with the CD substrate thickness of 1.2 mm.

Figure 4:
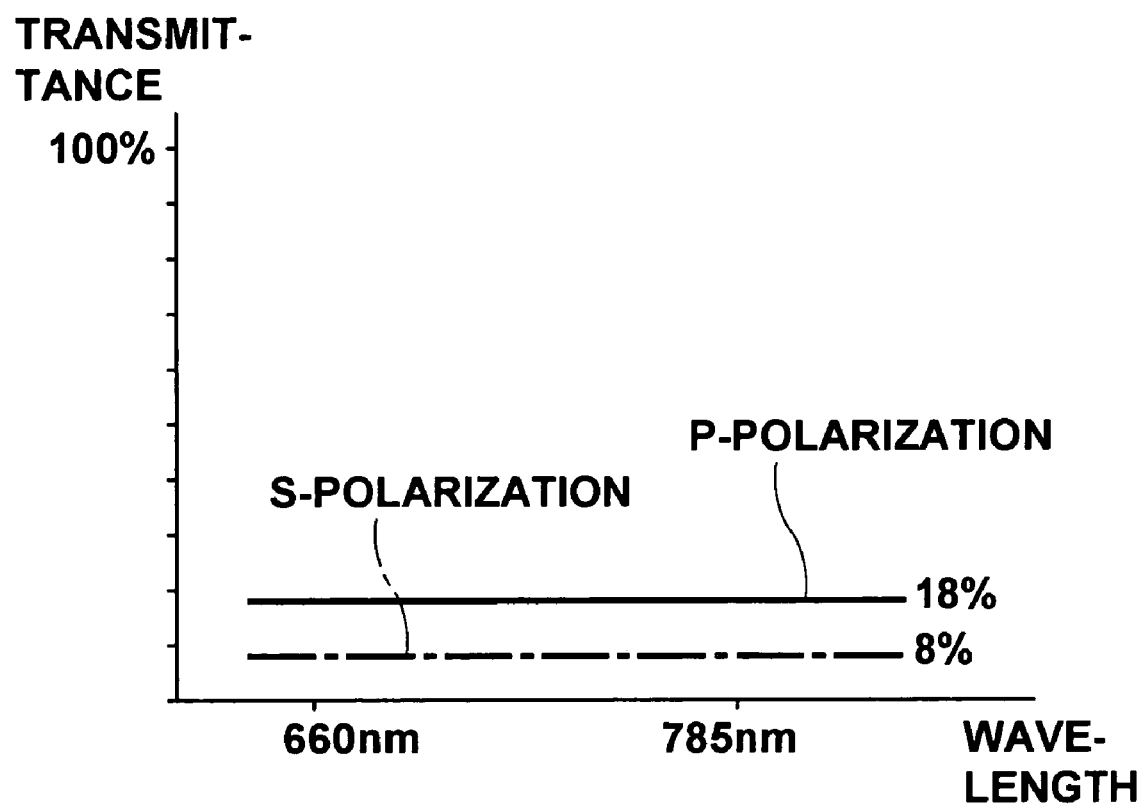
FIG. 4 is a characteristic diagram showing a film characteristic of a splitting surface of a plate-like beam splitter.

The splitting surface 7a of the plate-like beam splitter 7 has a film characteristic of substantially reflecting both p-polarization and s-polarization components of laser light regardless of laser light wavelength, as shown in FIG. 4. More specifically, the splitting surface 7a exhibits transmittance of approximately 8% (i.e., reflectance of approximately 92%) with respect to s-polarization, while exhibiting transmittance of approximately 18% (i.e., reflectance of approximately 82%) with respect to p-polarization.

Accordingly, both the laser light of the first wavelength and the laser light of the second wavelength which are directed onto the splitting surface 7a of the plate-like beam splitter 7 in s-polarized state by the polarizing beam splitter 4 are mostly reflected, at 92% reflectance, so as to be directed to the objective lens 11.

As a result, with respect to the laser light of the first wavelength for DVD, transmittance of 96% at the splitting surface 4a of the polarizing beam splitter 4 and reflectance of 92% at the splitting surface 7a of the plate-like beam splitter 7 can be attained, thereby ensuring high light use efficiency.

Similarly, with respect to the laser light of the second wavelength for CD, reflectance of 96% at the splitting surface 4a of the polarizing beam splitter 4 and reflectance of 92% at the splitting surface 7a of the plate-like beam splitter 7 can be attained, thereby ensuring high light use efficiency.

The laser light converged by the objective lens 11 and irradiated on the signal surface of the DVD or CD are modulated and reflected by the signal surface so as to be re-directed through the objective lens 11. This light travels back in the optical path identical to the outgoing path, that is, the optical path proceeding via the quarter-wave plate 10, the collimator lens 9, and the bend-up mirror 8, so as to reach the plate-like beam splitter 7.

The quarter-wave plate 10 is broadband compatible, and serves to apply a shift in the polarization direction (in other words, the phase difference) by a quarter wavelength with respect to both the laser light having the first wavelength and the laser light having the second wavelength. Accordingly, both the laser light having the first wavelength and the laser light having the second wavelength are subjected to a quarter wavelength shift (in other words, phase difference of 90°) by the quarter-wave plate 10 in the outgoing path so as to be circularly polarized, and irradiated on a disc in the circularly polarized state. The laser light reflected off of the disc is further subjected to a quarter wavelength shift (in other words, phase difference of 90°) by the quarter-wave plate 10 in the incoming path, so as to be linearly polarized in a polarization direction which differs by 90° from the polarization direction in the outgoing path.

Consequently, in the incoming path, both the laser light having the first wavelength and the laser light having the second wavelength become p-polarized with respect to the splitting surface 7a of the plate-like beam splitter 7. By virtue of the p-polarized state, the laser light is transmitted through the plate-like beam splitter 7 at 18% transmittance. The laser light transmitted through the plate-like beam splitter 7 is subsequently imparted with astigmatism for focus control by providing a parallel flat plate 12 arranged at a predetermined angle (in the present example, tilted at an angle of 32.5°) with respect to a plane perpendicular to the optical axis of the laser light. The laser light imparted with astigmatism is directed onto an optical detector 13.

In the optical detector 13, a single light-receiving section is commonly employed as a DVD light-receiving section for use in DVD recording and reproduction and as a CD light-receiving section for use in CD recording and reproduction. As shown in FIG. 5, the optical detector 13 includes a main light-receiving region 13a and two sub light-receiving regions 13b, 13c for receiving the three split beams, respectively. Each of the main light-receiving region 13a and two sub light-receiving regions 13b, 13c is subdivided into four segments by two dividing lines that are provided orthogonal to one another. An output from each of the segments of the main and two sub light-receiving regions are used to calculate not only the main signals for performing DVD and CD recording and reproduction, but also tracking error signals and focus error signals corresponding to tracking control schemes and focus control schemes appropriate for the respective disc types.

Meanwhile, the laser light of the first wavelength and the laser light of the second wavelength which enter the splitting surface 7a of the plate-like beam splitter 7 in p-polarized state in the incoming path are reflected off of the splitting surface 7a at 82% reflectance so as to be directed back to the polarizing beam splitter 4. The laser light rays of the first and the second wavelength reaching back to the polarizing beam splitter 4 are also p-polarized with respect to the splitting surface 4a of the polarizing beam splitter 4. The film characteristic of the splitting surface 4a is such that the splitting surface 4a exhibits high transmittance of 96% with respect to p-polarized laser light of both the first and the second wavelength. The incoming laser light is therefore transmitted through the splitting surface 4a of the polarizing beam splitter 4 without being sufficiently attenuated. However, because the diffraction filter 3a for diffracting p-polarization is included in the diffraction grating 3 arranged in front of the first laser diode 1, the diffraction filter 3a prevents the incoming light from reaching the first laser diode 1.

On the other hand, the splitting surface 4a of the polarizing beam splitter 4 exhibits low reflectance of 4% with respect to p-polarized laser light of both the first and the second wavelength. Accordingly, the incoming laser light reflected off of the splitting surface 4a of the polarizing beam splitter 4 is sufficiently attenuated.

As such, in the present embodiment, laser light is prevented from reaching back to the laser diode originally emitted the laser light to cause interference. At the same time, it is possible to prevent occurrences in which laser light reflected off of a laser chip end surface of a laser diode (which differs from the one that originally emitted the laser light) reaches back to the originally-emitting laser diode to cause interference.

It should be noted that the plate-like beam splitter 7 transmits, at 8% transmittance, the outgoing laser light of both the first and the second wavelengths which enter the splitting surface 7a in s-polarized state. In other words, each laser light emitted from the first laser diode 1 or the second laser diode 2 includes a leak component which is leaked in the transmitting direction of the plate-like beam splitter 7, apart from the main component which advances toward the objective lens 11. The present embodiment is configured such that the leak component of the laser light is received by a front monitor diode 14. With this arrangement, the front monitor diode 14 receives the emitted one of the laser light having the first wavelength or the laser light having the second wavelength. Based on an amount of laser light received by the front monitor diode 14, it is possible to control drive signals for driving the first and the second laser diode 1, 2. In this manner, the amounts of laser light emitted by the first and the second laser diodes 1, 2 can be controlled to prescribed amounts.

It will be obvious to those having skill in the art that many changes may be made in the above-described details of the examplary embodiments. The scope of the present invention, therefore, should be determined by the following claims.

What is claimed is:

1. An optical pickup device, comprising:
a first laser source which emits laser light having a first wavelength which is suited for recording and replaying a first signal to and from a digital versatile disc (DVD); and
a second laser source which is arranged in an optical path apart from that of the first laser source and emits laser light having a second wavelength which differs from the first wavelength and which is suited for recording and replaying a second signal to and from a compact disc (CD) recording medium; wherein
the optical pickup device is configured such that each of the laser light rays emitted from the first and the second laser source is directed into a common optical path by means of a polarizing beam splitter, the laser light directed into the common optical path is reflected by a plate-like beam splitter so as to be directed to an objective lens, the laser light is then converged by means of the objective lens and irradiated on a signal recording medium, and laser light reflected off of the signal recording medium is transmitted through the plate-like beam splitter and directed to an optical detector;
the first laser source is arranged on a transmitting side of the polarizing beam splitter, while the second laser source is arranged on a reflecting side of the polarizing beam splitter;
the polarizing beam splitter includes a splitting surface which substantially transmits s-polarization and p-polarization components of the laser light having the first wavelength and substantially reflects s-polarization component of the laser light having the second wavelength and substantially transmits p-polarization component of the laser light having the second wavelength; and
the plate-like beam splitter includes a splitting surface which has a reflectance that is higher than its transmittance for both s-polarized and p-polarized light, regardless of whether the laser light has the first wavelength or the second wavelength, and the transmittance of the plate-like beam splitter splitting surface for p-polarized light is in the range of 15% -20% for laser light having the first wavelength and for laser light having the second wavelength.

2. The optical pickup device as defined in claim 1, wherein the first wavelength is shorter than the second wavelength.

3. The optical pickup device as defined in claim 1, further comprising:
a diffraction filter provided between the first laser source and the polarization beam splitter, which exhibits a diffraction effect with respect to p-polarization laser light.

4. An optical pickup device, comprising:
a first laser source which emits laser light having a first wavelength which is suited for recording and replaying a first signal to and from a digital versatile disc (DVD) recording medium; and
a second laser source which is arranged in an optical path apart from that of the first laser source and emits laser light having a second wavelength which differs from the first wavelength and which is suited for recording and replaying a second signal to and from a compact disc (CD) recording medium; wherein
the optical pickup device is configured such that each of the laser light rays emitted from the first and the second laser source is directed into a common optical path by means of a polarizing beam splitter, the laser light directed into the common optical path is reflected by a plate-like beam splitter so as to be directed to an objective lens, the laser light is then converged by means of the objective lens and irradiated on a signal recording medium, and laser light reflected off of the signal recording medium is transmitted through the plate-like beam splitter and directed to an optical detector;
the first laser source is arranged on a transmitting side of the polarizing beam splitter, while the second laser source is arranged on a reflecting side of the polarizing beam splitter;
the polarizing beam splitter includes a splitting surface which substantially transmits s-polarization component of the laser light having the first wavelength and substantially reflects s-polarization component of the laser light having the second wavelength; and
the plate-like beam splitter includes a splitting surface which has a reflectance that is higher than its transmittance for both s-polarized and p-polarized light, regardless of whether the laser light has the first wavelength or the second wavelength, and the transmittance of the plate-like beam splitter splitting surface for p-polarized light is in the range of 15% -20% for laser light having the first wavelength and for laser light having the second wavelength;
a front monitor light-receiving element is disposed to receive a leak component of the laser light which is irradiated from the first laser source and the second laser source onto the splitting surface of the plate-like beam splitter in the common optical path extending from a respective light source toward the signal recording medium and leaked in a direction along which the laser light transmits through the plate-like beam splitter, a magnitude of the leak component being utilized to control an amount of the laser light emitted by the first or second laser sources.

5. The optical pickup device as defined in claim 4, wherein the first wavelength is shorter than the second wavelength.

6. The optical pickup device as defined in claim 4, wherein the splitting surface of the polarization beam splitter is provided with a film characteristic of substantially transmitting p-polarization component of the laser light having the second wavelength while substantially transmitting both p-polarization and s-polarization components of the laser light having the first wavelength.

7. The optical pickup device as defined in claim 4, further comprising:
a diffraction filter provided between the first laser source and the polarizing beam splitter, which exhibits a diffraction effect with respect to p-polarization laser light.

8. The optical pickup device as defined in claim 1, wherein the first wavelength is in a range of about 650-665 nm and the second wavelength is in a range of about 775-795 nm.

9. The optical pickup device as defined in claim 4, wherein the first wavelength is in a range of about 650-665 nm and the second wavelength is in a range of about 775-795 nm.

* * * * *